(12) United States Patent　(10) Patent No.: US 12,118,158 B2
Amano　(45) Date of Patent: Oct. 15, 2024

(54) INPUT DISPLAY DEVICE

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/505,286

(22) Filed: Nov. 9, 2023

(65) Prior Publication Data

US 2024/0192790 A1　Jun. 13, 2024

(30) Foreign Application Priority Data

Dec. 13, 2022　(JP) .................. 2022-198489

(51) Int. Cl.
*G06F 3/0362* (2013.01)
*B60K 35/00* (2006.01)
*G06F 3/01* (2006.01)
*G06F 3/044* (2006.01)
*G06F 3/04847* (2022.01)
*B60K 35/10* (2024.01)
(Continued)

(52) U.S. Cl.
CPC ............ *G06F 3/0362* (2013.01); *B60K 35/00* (2013.01); *G06F 3/013* (2013.01); *G06F 3/044* (2013.01); *G06F 3/04847* (2013.01); *B60K 35/10* (2024.01); *B60K 35/22* (2024.01); *B60K 35/28* (2024.01); *B60K 2360/1434* (2024.01); *B60K 2360/171* (2024.01); *B60K 2360/23* (2024.01); *G06F 2203/04108* (2013.01); *G06F 2203/04809* (2013.01)

(58) Field of Classification Search
CPC ........ G06F 3/0362; G06F 3/013; G06F 3/044; G06F 3/04847; G06F 2203/04108; G06F 2203/04809; B60K 35/00; B60K 2360/1434; B60K 2360/171; B60K 2360/23; B60K 35/28; B60K 35/10
See application file for complete search history.

(56) References Cited

U.S. PATENT DOCUMENTS 11,602,972 B1 *　3/2023　Ahn ..................... G06F 3/0338
2005/0115816 A1　6/2005　Gelfond
(Continued)

FOREIGN PATENT DOCUMENTS

DE　10 2010 010574 A1　9/2011
JP　2020-190832 A　11/2020
WO　WO 2018/060384 A1　4/2018

OTHER PUBLICATIONS

Extended European Search Report from EP application No. 23214419.6, May 17, 2024, 8 pgs.

*Primary Examiner* — Peter D McLoone
(74) *Attorney, Agent, or Firm* — Crowell & Moring LLP (57) ABSTRACT

An input display device includes a display capable of displaying an image, a touch panel including at least one transparent three-dimensional UI unit on a front face thereof, a touch sensing unit configured to sense a touch operation on the touch panel based on a change in electrostatic capacitance of the touch panel, and a display control unit capable of displaying an image related to the operation in a region where the three-dimensional UI unit of the display is present. The three-dimensional UI unit includes an upper face and a side face connected to the upper face, and a function of reflecting an image related to an operation is imparted to the side face.

8 Claims, 7 Drawing Sheets

(51) Int. Cl.
    *B60K 35/22* (2024.01)
    *B60K 35/28* (2024.01)

(56) References Cited

U.S. PATENT DOCUMENTS

2019/0126819 A1   5/2019   Schubert
2020/0136618 A1*  4/2020   Lou .................... G06F 3/04847

* cited by examiner

INPUT DISPLAY DEVICE

RELATED APPLICATION

The present application claim priority to Japanese Patent Application No. 2022-198489, filed Dec. 13, 2022, the entirety of which is herein incorporated by reference.

BACKGROUND

1. Field

The present disclosure relates to an input display device having a human-machine interface function, and more particularly, to an input display device including a transparent three-dimensional operation unit.

2. Description of the Related Art

An input display device is disclosed in which a protrusion is provided on a touch panel disposed to be superimposed on a display, and an image such as an operation icon is displayed at a position overlapping the protrusion (for example, JP 2020-190832 A). The user performs an input by performing a touch operation on the protrusion.

SUMMARY

In a display device that performs a capacitive touch operation, there has been proposed a user interface (hereinafter, referred to as a three-dimensional UI) in which a cover glass has an uneven shape, so that a touch position is tactilely recognized and the touch position can be understood without looking.

Figure 1A:
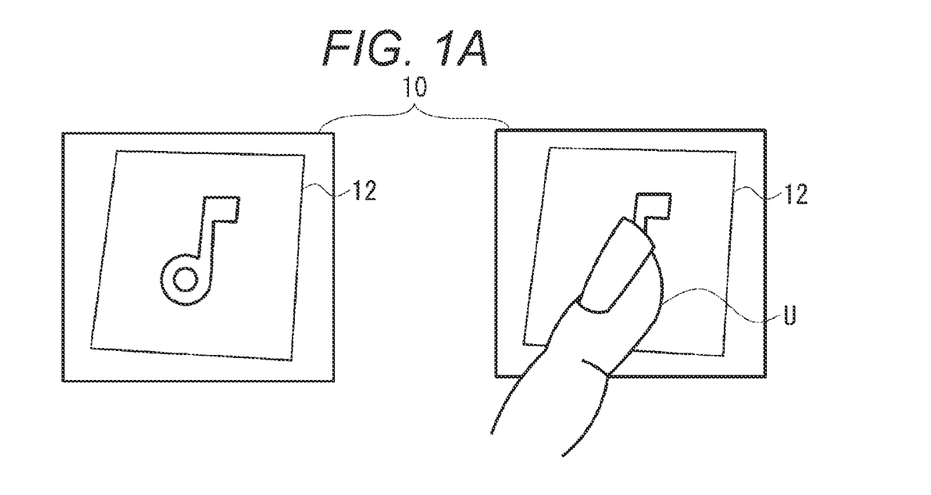
FIG. 1A illustrates an operation example of a flat touch panel.

FIG. 1A is an operation example of a conventional flat touch panel, where a user U visually recognizes an operation icon 12 displayed on a display 10, and performs an input by performing a touch operation on the position of the operation icon 12 (note in the example of Figure).

Figure 1B:
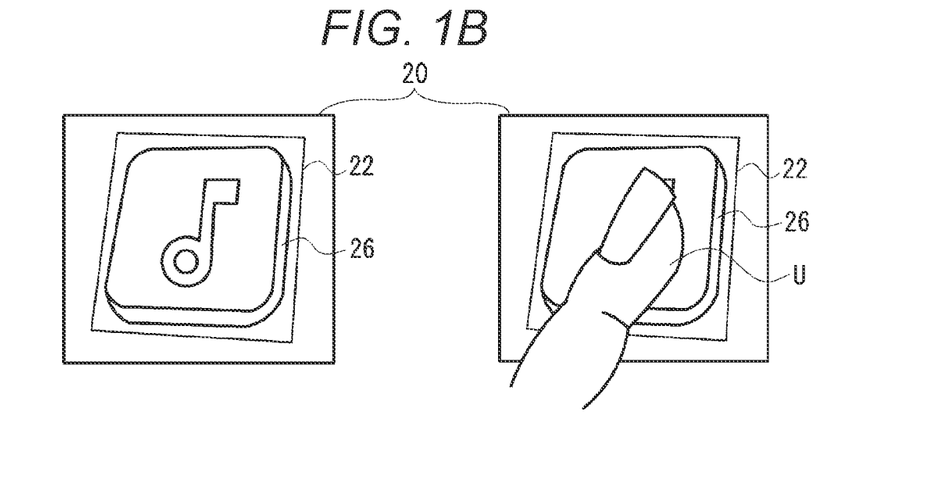
FIG. 1B illustrates an operation example of a touch panel of a three-dimensional UI.
Figure 1C:
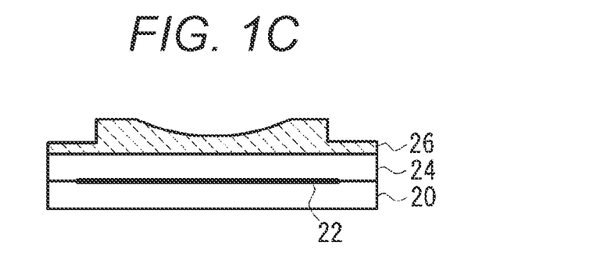
FIG. 1C is a schematic cross-sectional view of the three-dimensional UI.

FIG. 1B is an operation example of a touch panel having a three-dimensional UI, and FIG. 1C is a schematic cross-sectional view of the three-dimensional UI. A transparent cover lens 26 having an uneven shape is attached onto a touch panel 24, and a display 20 displays an operation icon 22 at a position overlapping the cover lens 26. The user U performs input by touching the cover lens 26 with a finger. A highly sensitive electrostatic sensor capable of sensing the electrostatic capacitance (distance) of the finger even when the finger is away from the sensor is used for the touch sensing, and the presence or absence of the touch can be determined even with the thick cover lens 26. This makes it possible to reduce touch mistakes (operation error) under a situation where it is difficult to look at the in-vehicle display during driving.

Figure 2A:
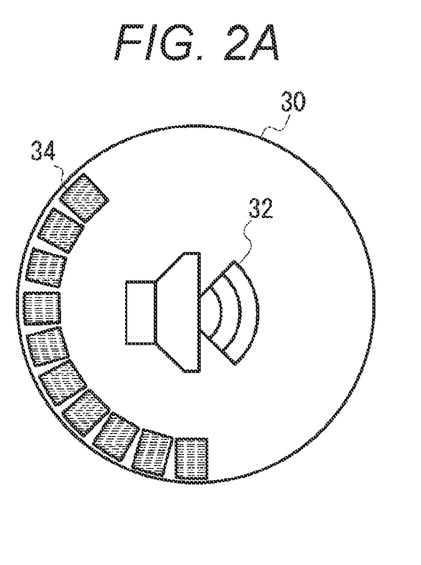
FIGS. 2A and 2B are views illustrating a problem of a conventional three-dimensional UI unit.

When a graphical user interface (GUI) such as an icon is displayed in the three-dimensional UI, video representation in a limited area according to the part design is obtained. FIG. 2A illustrates an example in which a speaker icon 32 representing adjustment of a volume and a gauge (scale) 34 representing a rotation amount of a rotation operation on a knob 30 are displayed in a region where the cylindrical transparent knob (button) 30 is present. The user slides a side face of the knob 30 with a finger pad to perform a rotation operation, and checks a rotation amount with the gauge 34. The knob 30 does not actually rotate.

Since the display area is limited within the range of the knob 30, the design in which the speaker icon 32 is enlarged is limited, and when the knob diameter is small, the gauge 34 is small, and sufficient visibility cannot be secured.

Figure 2B:
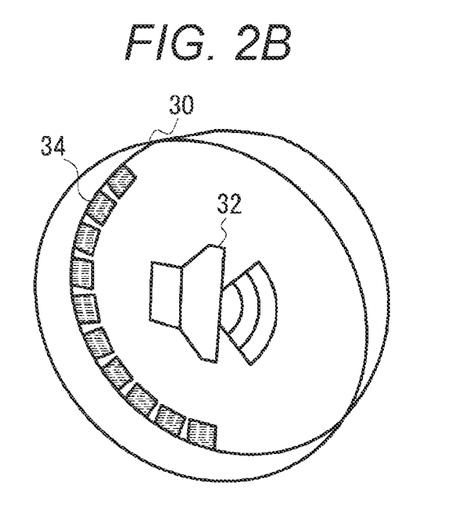

As illustrated in FIG. 2A, the visibility of the speaker icon 32 and the gauge 34 can be secured when the knob 30 is viewed from the front. However, as illustrated in FIG. 2B, when the knob 30 is viewed from the obliquely right direction, the speaker icon 32 and the gauge 34 become small, and the visibility is deteriorated. For example, when the display is disposed at the center of the vehicle, the line-of-sight position or the line-of-sight direction of the user (such as the driver) is in the obliquely right direction.

Such a problem is not limited to the knob shape and gauge representation, and may occur when GUI representation is performed in a three-dimensional part having a height. Therefore, in the video representation of the three-dimensional UI, a representation method for ensuring visibility in the three-dimensional part is required.

The present disclosure solves such a conventional problem. It is an object of the present disclosure to provide an input display device that improves visibility of an image displayed in a region where an operation unit having a three-dimensional shape is present.

An input display device according to the present disclosure includes a display for displaying an image, and a capacitive touch panel attached to the display and including at least one transparent three-dimensional operation unit on a front face of the touch panel, a sensing unit configured to sense a touch operation including proximity to the touch panel, and a display control unit capable of displaying an image related to an operation in a region where the operation unit of the display is present, wherein the operation unit has an upper face and a side face connected to the upper face, and the side face has a function of reflecting an image related to the operation.

In one aspect, the side face includes a mirror-finished face. In an aspect, the side face includes a reflective film or a specular coating. In an aspect, the side face includes a film having a reflective face on a back face side and a texture on a front face side. In an aspect, the input display device further includes a detection unit configured to detect a viewpoint or a line-of-sight direction of a user, wherein the display control unit changes an image related to the operation according to a viewpoint or a line-of-sight direction detected by the detection unit. In an aspect, the display control unit extends an image reflected by the side face by extending an image related to the operation. In an aspect, the three-dimensional operation unit is a cylindrical knob, wherein the sensing unit senses a rotation amount on the knob, wherein the display control unit displays a gauge corresponding to the sensed rotation amount along an outer periphery of the knob, and wherein the side face of the knob reflects the gauge. In an aspect, the display is mounted on a vehicle, and the detection unit detects a line-of-sight position of each of a driver and/or a passenger.

According to the present disclosure, since the function of reflecting the image related to the operation is imparted to the side face of the operation unit having the three-dimensional shape, the visibility of the image related to the operation can be improved, and the expression of the image related to the operation can be diversified.

DETAILED DESCRIPTION

Embodiments of the present disclosure will now be described. An input display device of the present disclosure provides an interface between a person and a machine. The input display device of the present disclosure is not particularly limited, but is applied to, for example, an electronic device equipped with a display having a touch panel on which an operation unit having a three-dimensional shape is formed. The electronic device equipped with the display with a touch panel is, for example, an in-vehicle device having a navigation function, an audio-visual function, a television function, and/or the like.

Figure 3:
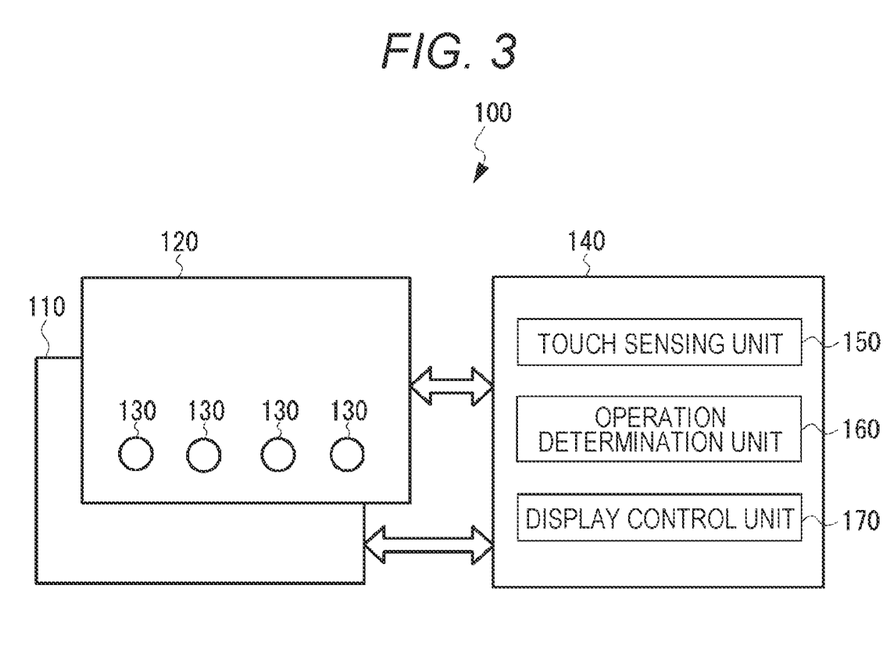
FIG. 3 is a block diagram illustrating a configuration of an input display device according to an embodiment of the present disclosure.

Next, embodiments of the present disclosure will be described in detail with reference to the drawings. FIG. 3 is a block diagram illustrating a configuration of an input display device according to the embodiment of the present disclosure. An input display device 100 of the present embodiment includes a display 110 for displaying an image and a video, a touch panel 120 including a capacitive sensor mounted on the display 110, a transparent three-dimensional UI unit (or an operation unit) 130 having one or a plurality of stereoscopic shapes attached to a front face of the touch panel 120, and a controller 140 that controls image display of the display 110, touch sensing of the touch panel 120, and the like.

The display 110 is not particularly limited, but includes, for example, a liquid crystal panel or an organic EL panel, and displays image data provided from the controller 140. For example, a GUI image (for example, various images such as icons and gauges) related to the operation of the three-dimensional UI unit 130 is displayed in the region where the three-dimensional UI unit 130 is present.

The touch panel 120 includes, for example, a plurality of sensors (sensing units) formed at positions where a plurality of X-side and Y-side electrode lines intersect, and the sensors sense an electrostatic capacitance when a user's finger, hand, or the like approaches or comes into contact with the touch panel 120 or the three-dimensional UI unit 130. The touch panel 120 is mounted on the display 110 and provides an input interface for the user to make an input to an icon or the like displayed on the display 110.

The touch panel 120 further includes one or more three-dimensional UI units 130 on the transparent panel. The three-dimensional UI unit 130 includes a transparent member having an uneven shape, and the shape, size, height, and the like thereof are not particularly limited. However, when a user's hand or finger approaches or comes into contact with the three-dimensional UI unit 130, the three-dimensional UI unit 130 is configured such that the electrostatic capacitance at that position changes.

FIG. 3 illustrates an example in which four three-dimensional UI units 130 are attached to the lower portion of the touch panel 120. A GUI image such as an icon or a gauge representing an operation is displayed in a region where the three-dimensional UI unit 130 of the display 110 is present, and the user visually recognizes the GUI image and performs input via the three-dimensional UI unit 130.

The three-dimensional UI unit 130 is, for example, a rectangular or columnar protruding knob or button, and is composed of, for example, a clear part (transparent member) such as glass, acrylic, or polycarbonate. However, characters, figures, and the like may be drawn on a portion of the front face of the three-dimensional UI unit 130 within a range not affecting the visibility of the GUI image displayed on the display 110. The three-dimensional UI unit 130 may be attached to the front face of the touch panel 120 at a predetermined position using, for example, a double-sided adhesive, or may be integrally molded with a cover glass attached to the front face of the touch panel 120.

Information regarding the position and shape of the three-dimensional UI unit 130 (for example, coordinates on the touch panel, shapes, sizes, and heights of the bottom face and the front face, and the like) is registered in a memory or the like in the controller 140. For example, when the three-dimensional UI unit 130 is a cylindrical knob, the coordinates of the center of the bottom face of the knob are registered as the information about the position. In addition, the radius or diameter of the bottom face, the radius or diameter of the front face, the height of the side face, and the like of the knob are registered as the information about the shape. In a case where the three-dimensional UI unit 130 is a rectangular and/or parallelepiped knob, coordinates of a position where diagonal lines of a rectangular bottom face intersect are registered as information about the position, and vertical and horizontal lengths of the bottom face, vertical and horizontal lengths of the front face, a height of the side face, and the like are registered as information about the shape. When a finger approaching the touch panel 120 is sensed, the controller 140 refers to the registered information about the position and shape of the three-dimensional UI unit 130 and determines whether the finger acts as a touch operation on the three-dimensional UI unit 130.

The controller 140 includes hardware and/or software resources, and performs overall processing of the input display device using, for example, an arithmetic processing unit, a microcontroller including a ROM/RAM, or the like. For example, the controller performs display processing of the display 110, touch sensing or touch operation determination (sense touch position and finger distance, and determine whether a touch operation is performed) from an output value of the touch panel 120, and processing of video display/video switching according to the touch sensing or the touch operation determination.

As illustrated in FIG. 3, the controller 140 includes a touch sensing unit 150, an operation determination unit 160, and a display control unit 170. These units 150, 160, 170 (and also 210, below) may be implemented by the controller 140, including the hardware and/or software resources referenced above. The touch sensing unit 150 drives the plurality of electrode lines on the X side and/or the Y side of the touch panel 120, measures the capacitance of the sensing unit of the driven electrode lines, senses the touch position based on the measurement result, and provides the sensing result to the operation determination unit 160.

The operation determination unit 160 determines the presence or absence of a touch operation on the touch panel 120 or a touch operation on the three-dimensional UI unit 130 based on the measurement result of the touch sensing unit 150. Here, the touch includes not only contact of the user's finger with the touch panel 120 or the three-dimensional UI unit 130 but also approach of the finger to the touch panel 120 or the three-dimensional UI unit 130. For example, when the user's finger touches or approaches the touch panel 120, the operation determination unit 160 determines the presence or absence of the touch operation based on the change in electrostatic capacitance of the corresponding sensing unit, and similarly, when the user's finger touches or approaches the three-dimensional UI unit 130, the operation determination unit determines the presence or absence of the touch operation on the three-dimensional UI unit 130 based on the change in electrostatic capacitance of the corresponding sensing unit.

The display control unit 170 displays an image and a video on the display 110, and displays a GUI image related to the operation of the three-dimensional UI unit 130 in a region where the three-dimensional UI unit 130 is present. In addition, the display control unit 170 switches an image to be displayed on the display 110 to another image in response to the operation determination unit 160 determining that a touch operation has been performed.

Figure 4A:
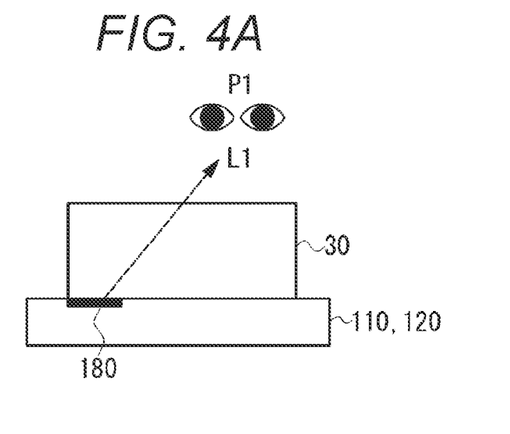
FIGS. 4A and 4B are diagrams for explaining incidence of light when a GUI image is visually recognized by a conventional three-dimensional UI unit.
Figure 4B:
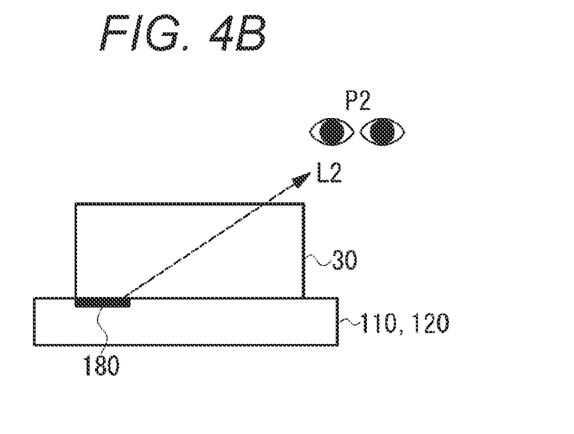
Figure 4C:
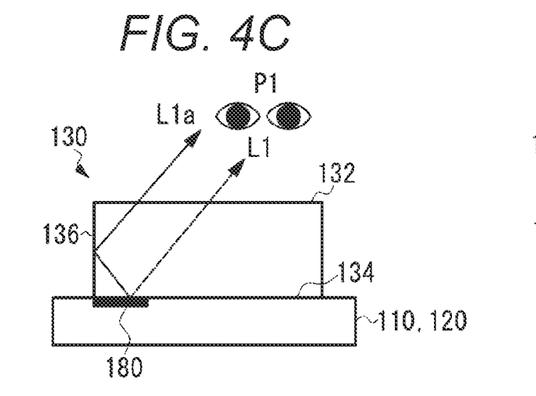
FIGS. 4C and 4D are diagrams for explaining incidence of light when a GUI image is visually recognized by a three-dimensional UI unit of the present embodiment.
Figure 4D:
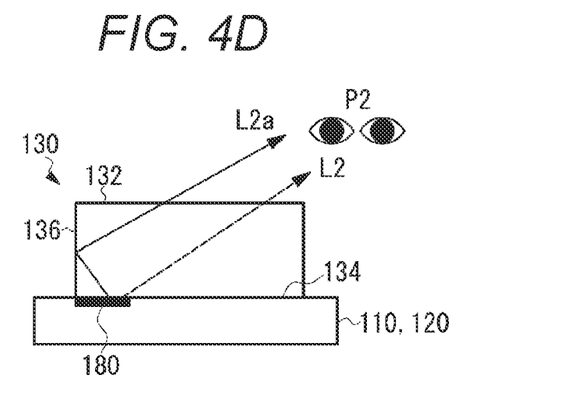

Next, an outline of the input display device of the present embodiment will be described with reference to FIG. 4. FIGS. 4A and 4B schematically illustrate the visual recognition of the GUI image displayed in the region where the conventional three-dimensional UI unit is present, and FIGS. 4C and 4D schematically illustrate the visual recognition of the GUI image displayed in the region where the three-dimensional UI unit of the present embodiment is present. Here, a cylindrical knob is exemplified as the three-dimensional UI unit, and a gauge (see the gauge 34 in FIG. 2) is exemplified as the GUI image.

As illustrated in FIG. 4A, in a case where a GUI image 180 displayed on the display 110 is visually recognized in the conventional three-dimensional UI unit 30, light L1 (indicated by a broken line) from the GUI image 180 is transmitted through the three-dimensional UI unit 30 and is incident on a viewpoint P1 of the user. Furthermore, as illustrated in FIG. 4B, in a case where the viewpoint P1 of the user moves to a viewpoint P2, light L2 (indicated by a broken line) from the GUI image 180 is incident on the viewpoint P2 in a more angled or inclined manner than the light L1. As a result, since the user visually recognizes the GUI image 180 from the oblique direction, the GUI image 180 appears small, and the visibility is reduced.

On the other hand, in the three-dimensional UI unit 130 of the present embodiment, the height of the side face of the three-dimensional UI unit is used, and a function of specularly reflecting the GUI image 180 is imparted to the side face 136. The three-dimensional UI unit 130 has a front face 132, a bottom face 134, and a side face 136 coupling the front face 132 and the bottom face 134, and a function of reflecting the GUI image 180 is added to part or the whole of the side face 136.

As illustrated in FIG. 4C, when the GUI image 180 displayed on the display 110 is visually recognized in the three-dimensional UI unit 130 of the present embodiment, in addition to the light L1 from the GUI image 180, light L1a obtained by specularly reflecting the light L1a from the GUI image 180 on the side face 136 is incident on the viewpoint P1 of the user. Furthermore, as illustrated in FIG. 4D, in a case where the viewpoint P1 of the user moves to the viewpoint P2, similarly, in addition to the light L2 from the GUI image 180, light L2a specularly reflected by the side face 136 is incident on the viewpoint P2. As a result, the user visually recognizes the GUI image 180 by the light L1a, L2a reflected by the side face 136 of the three-dimensional UI unit 130 in addition to the light L1, L2 from the GUI image 180. Therefore, the display area of the GUI image 180 is extended as compared with that in the conventional case, and the visibility is improved.

Figure 5A:
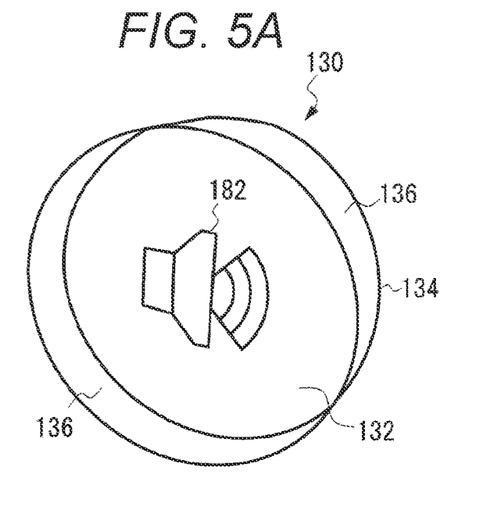
FIGS. 5A and 5B are diagrams illustrating examples of hidden/displayed GUI images in the three-dimensional UI unit according to the embodiment of the present disclosure.
Figure 5B:
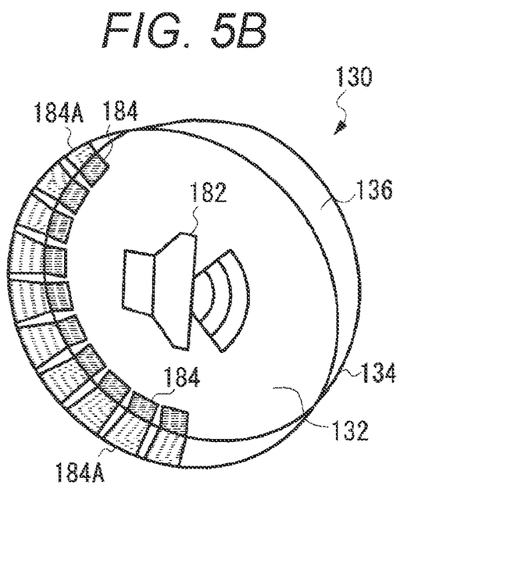

FIG. 5A is an example when the GUI image (gauge) of the three-dimensional UI unit of the present embodiment is hidden, and FIG. 5B is an example when the GUI image (gauge) of the three-dimensional UI unit of the present embodiment is displayed. Here, an example is illustrated in which, for more accurate specular reflection of the GUI image, the side face 136 of the three-dimensional UI unit 130 is vertical, and a transparent part (made of acrylic) having a specular finish is used for the side face 136.

As illustrated in FIG. 5A, a volume icon 182 is displayed substantially at the center of the region where the three-dimensional UI unit 130 is present. At this time, the gauge indicating the rotation amount of the volume is hidden, and the image due to the reflection of the gauge is not displayed on the side face 136. On the other hand, as illustrated in FIG. 5B, when the gauge (GUI image) 184 is displayed on the display 110 along the outer periphery of the bottom face 134 of the three-dimensional UI unit 130, the gauge 184 is specularly reflected by the side face 136 of the three-dimensional UI unit 130, and a reflected image 184A is visually recognized. As a result, when the three-dimensional UI unit 130 is viewed from the oblique direction, the display area of the gauge 184 is extended to the side face 136, and the visibility is improved.

Figure 6:
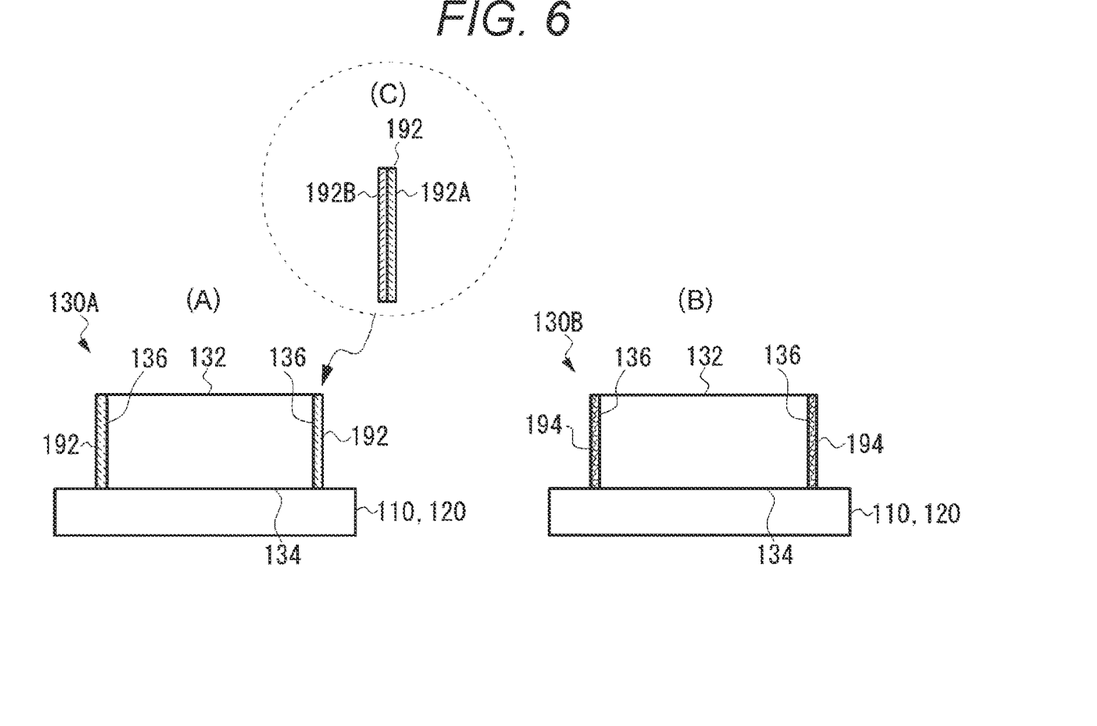
FIG. 6 is a diagram illustrating another configuration example of the three-dimensional UI unit according to the embodiment of the present disclosure.

In the above example, the mirror surface processing is performed on the side face 136 of the three-dimensional UI unit 130. That is, the mirror surface processing is performed on the part itself, but this is an example, and the GUI image may be reflected using another method. For example, in a three-dimensional UI unit 130A illustrated in FIG. 6A, a specular glossy film or a reflective film 190 may be wound around the side face 136 of the knob 130, and in a three-dimensional UI unit 130B illustrated in FIG. 6B, a specular coating 194 may be applied to the side face 136. Furthermore, as illustrated in FIG. 6C, a mirror surface or a reflective face 192 may be formed on the back face side of the film 190, and a texture 194 like a frosted glass may be formed on the front face side for touch comfort. This makes it possible to achieve both touch comfort and a mirror surface on the front and back faces of the film 190.

Figure 7:
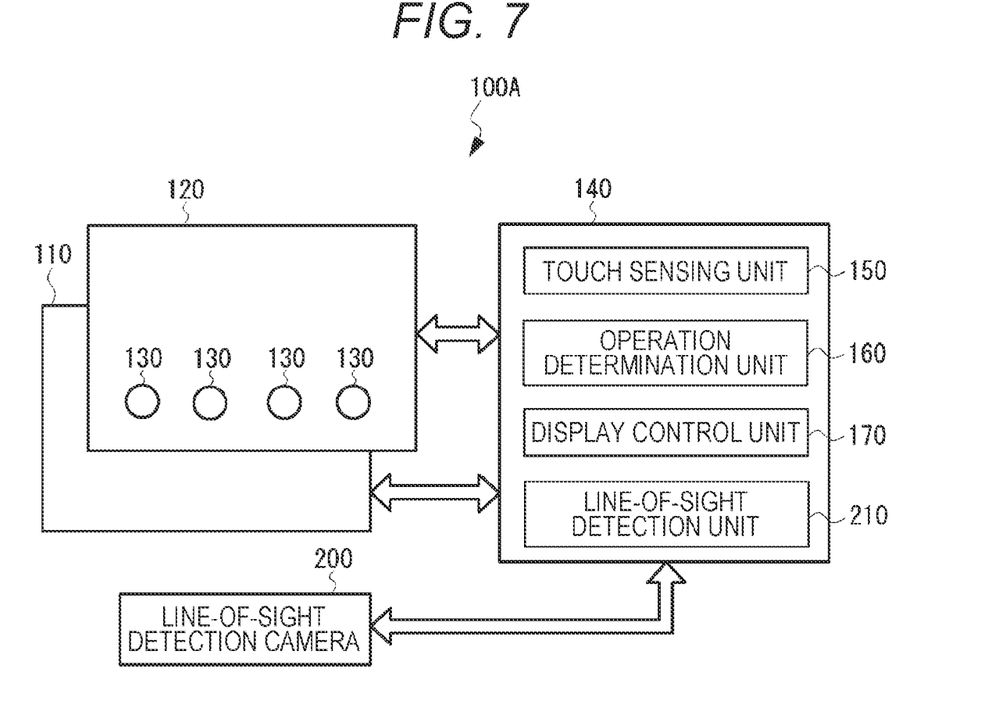
FIG. 7 is a block diagram illustrating a configuration of an input display device according to the second embodiment of the present disclosure.

Next, a second example of the present disclosure will be described. FIG. 7 is a block diagram illustrating a configuration of an input display device according to the second embodiment, and the same components as those in FIG. 3 are denoted by the same reference numerals. An input display device 100A according to the second embodiment further includes a line-of-sight detection camera 200 that detects a viewpoint or a line-of-sight direction (hereinafter, referred to as a viewpoint) of the user, and a line-of-sight detection unit 210.

Figure 8:
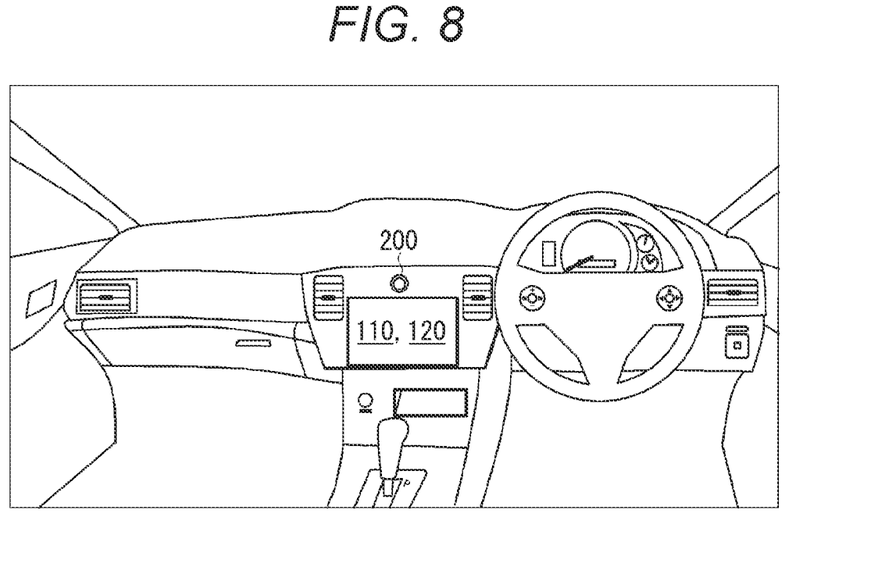
FIG. 8 is a layout example when the input display device of the second embodiment is mounted on a vehicle.

FIG. 8 is a layout example when the input display device 100A is mounted on a vehicle. The display 110 including the touch panel 120 is attached to a console in the center of the vehicle, and the line-of-sight detection camera 200 is attached, for example, close to above the display 110. In order to detect the viewpoints of the driver and the occupant in the passenger seat, two line-of-sight detection cameras 200 may be attached.

The line-of-sight detection camera 200 captures an image of the face of the driver and provides the captured image data to the line-of-sight detection unit 210 of the controller 140. The line-of-sight detection unit 210 detects the viewpoint of the driver by processing the image data from the line-of-sight detection camera 200. For example, the line-of-sight detection unit 210 extracts the feature point of the eyeball from the image data obtained by imaging the face. The line-of-sight detection unit 210 calculates the viewpoint of the driver with respect to the three-dimensional UI unit 130 based on the relative positional relationship (for example, the relative positional relationship is known from seat positional information and human's standard physical characteristics) between the display 110 and the face of the driver.

When the viewpoint of the passenger in the passenger seat is detected, the line-of-sight detection camera 200 provides image data obtained by imaging the face of the passenger to the line-of-sight detection unit 210. Furthermore, in a case where a driver monitoring system (DMS) for monitoring the state of the driver is mounted on the vehicle, information about the viewpoint of the driver provided from the DMS may be used instead of the line-of-sight detection camera 200.

Figure 9A:
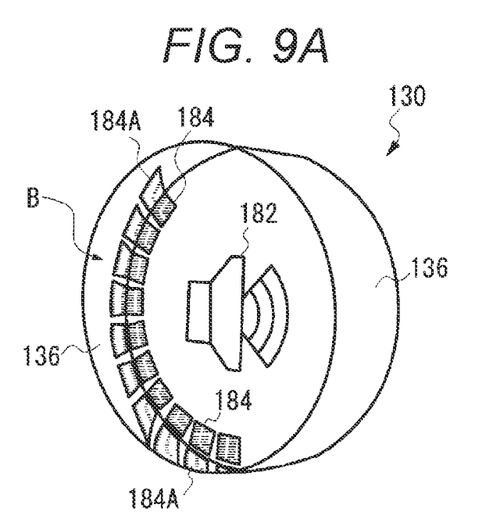
FIG. 9A is a diagram illustrating an example in which a gap of a GUI image is generated on a side face when a viewpoint or a line-of-sight direction of a user changes.

The display control unit 170 controls the display of the GUI image based on the viewpoint detected by the line-of-sight detection unit 210 such that the GUI image is appropriately reflected to the viewpoint of the user. For example, as illustrated in FIG. 9A, when the viewpoint of the user changes (for example, when the viewpoint further moves in the right direction), a gap (blank region) B is generated in part of the upper edge of the side face 136 when the size of the reflected image 184A of the GUI image and the size of the side face 136 do not match, such that the extension effect of the GUI image is weakened, and the visibility is reduced.

In the present embodiment, the display control unit 170 changes the GUI image according to the viewpoint of the user, and prevents the visibility of the GUI image from deteriorating even when the viewpoint of the user changes. That is, the display control unit 170 calculates that the gap B occurs, with which size, and at which position on the side face 136 from the viewpoint of the user. The calculation method is not particularly limited, but the display control unit 170 may calculate the gap B from, for example, the detected viewpoint, the display position and the display size of the GUI image on the display, the position of the three-dimensional UI unit 130, the position and the height of the side face 136, or the like, or may simply register a relationship between the viewpoint and the gap in a lookup table or the like, and refer to the relationship.

Figure 9B:
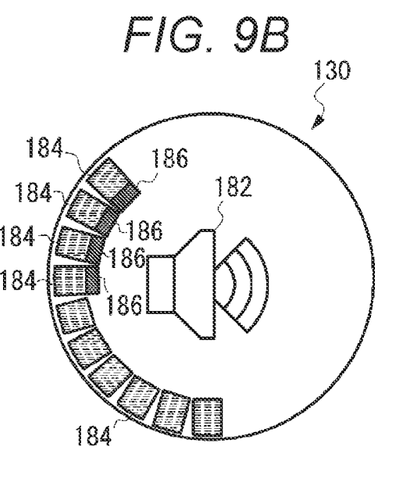
FIG. 9B is a diagram illustrating an example of a GUI image extended based on the viewpoint or the line-of-sight direction according to the second embodiment.
Figure 9C:
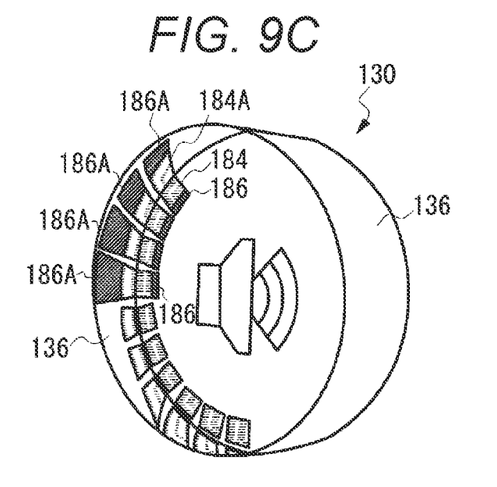
FIG. 9C is a diagram illustrating a state in which the GUI image extended according to the viewpoint or the line-of-sight direction according to the second embodiment is reflected on the side face; and, FIGS. 10A and 10B are diagrams illustrating examples of a line-of-sight detection unit according to the second embodiment of the present disclosure.

The display control unit 170 controls the display of the GUI image such that part or all of the calculated gap is eliminated, that is, the GUI image having the specular positional relationship with the calculated gap is extended. For example, as illustrated in FIG. 9B, the display control unit 170 displays an extended GUI image 186 on the display 110. As a result, as shown in FIG. 9C, the extended GUI image 186 is specularly reflected by the side face 136, and the user can visually recognize an extended GUI image 186A reflected by the side face 136. At least part of the gap B on the side face 136 is eliminated by the extended GUI image 186A, and the visibility of the GUI image can be maintained even when the viewpoint of the user changes.

When the driver monitoring system (DMS) can detect the viewpoints of both the driver and the passenger in the passenger seat, the DMS senses the viewpoint of a person who directs the line of sight to the display 110, and when both direct the line of sights at the same time, the DMS gives priority to the detection of the line of sight of the driver in consideration of safety.

Figure 10A:
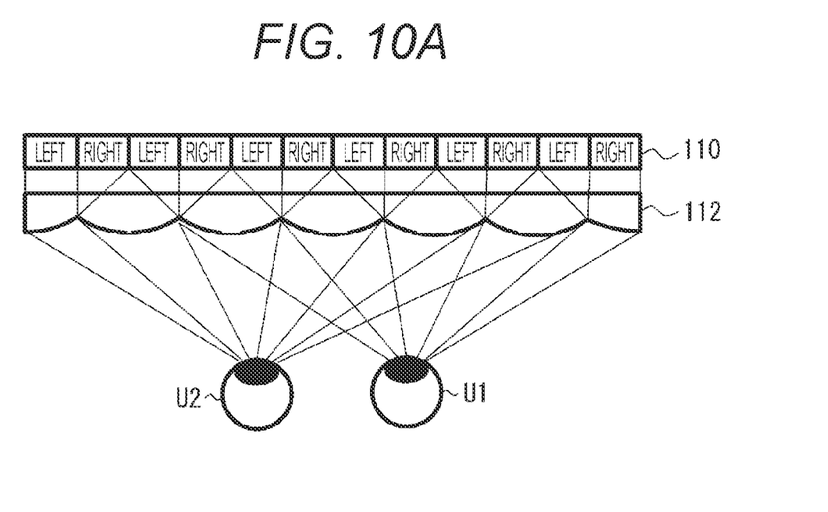
Figure 10B:
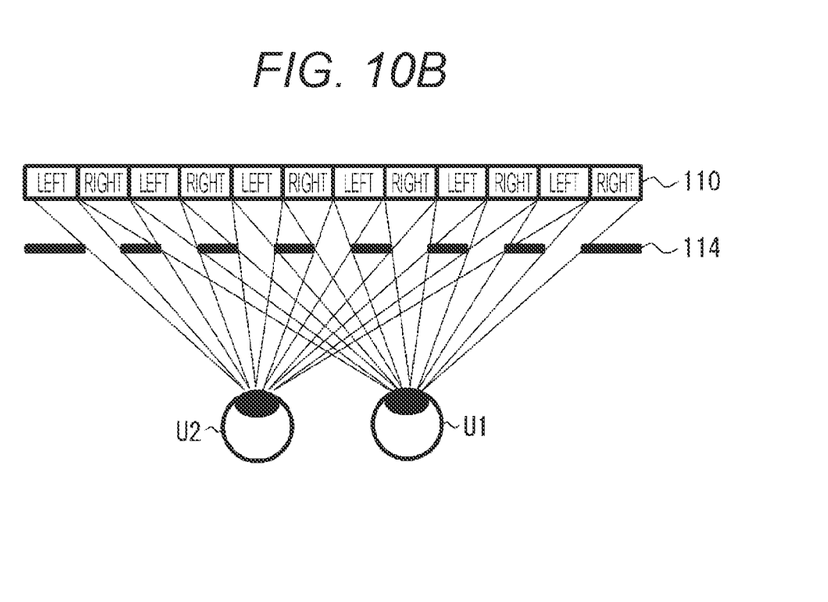

FIG. 10 illustrates a method of detecting the line of sight of both the driver and the passenger. FIGS. 10A and 10B illustrate a positional relationship between a display 110 and a driver U1 and a passenger U2 when viewed from above. FIG. 10A illustrates a lenticular lens 112 disposed in front of the display 110, and FIG. 10B illustrates a parallax barrier 114 disposed in front of the display 110. By using the lenticular lens 112 and the parallax barrier 114, it is possible to have a structure in which the video to be displayed is divided according to the viewpoint, and to provide two types of video outputs to the driver and the passenger. In the example of the drawing, the driver U1 can see the video indicated by "right", and the passenger U2 can see the video indicated by "left". As a result, it is possible to perform display control of the GUI image suitable for the line-of-sight or the line-of-sight direction of each of the driver and the passenger.

In the above embodiment, the cylindrical knob (button) is exemplified as the three-dimensional UI unit, but the three-dimensional UI unit is not limited thereto, and may have another shape. Furthermore, the side face of the three-dimensional UI unit does not necessarily need to be perpendicular to the bottom face/front face, and may be inclined. In the above embodiment, the volume icon and gauge are exemplified as the GUI image, but these are merely examples, and the GUI image may be an icon or display related to another operation.

Although the preferred embodiments of the present disclosure have been described in detail above, the present disclosure is not limited to the specific embodiments, and various modifications and changes can be made within the scope of the gist of the invention set forth in the claims.

What is claimed is:

1. An input display device comprising:
   a display for displaying an image,
   a capacitive touch panel attached to the display,
   at least one transparent three-dimensional operation unit on a front face of the touch panel,
   a sensing unit configured to sense a touch operation including proximity to the touch panel; and
   a display control unit configured to display an image related to an operation in a region where the operation unit of the display is present, wherein the operation unit has an upper face and a side face connected to the upper face, and the side face has a function of reflecting an image related to the operation.

2. The input display device according to claim 1, wherein the side face comprises a mirror-finished face.

3. The input display device according to claim 1, wherein the side face comprises a reflective film or a specular coating.

4. The input display device according to claim 1, wherein the side face comprises a film having a reflective face on a back face side and a texture on a front face side.

5. The input display device according to claim 1, further comprising a detection unit configured to detect a viewpoint or a line-of-sight direction of a user,
 wherein the display control unit is configured to change an image related to the operation according to a viewpoint or a line-of-sight direction detected by the detection unit.

6. The input display device according to claim 5, wherein the display control unit is configured to extend an image reflected by the side face by extending an image related to the operation.

7. The input display device according to claim 5, wherein the display is mounted on a vehicle, and wherein the detection unit detects a line-of-sight position of each of a driver and/or a passenger.

8. The input display device according to claim 1, wherein:

the three-dimensional operation unit is a cylindrical knob, the sensing unit senses a rotation amount on the knob, the display control unit displays a gauge corresponding to the sensed rotation amount along an outer periphery of the knob, and a side face of the knob reflects the gauge.

* * * * *